Aug. 19, 1958 V. R. TROGLIONE 2,848,099
TRANSFER APPARATUS BETWEEN CONVEYORS
Filed Oct. 2, 1956 2 Sheets-Sheet 1

INVENTOR.
VINCENT R. TROGLIONE
BY
Brown, Critchlow, Flick & Peckham
HIS ATTORNEYS

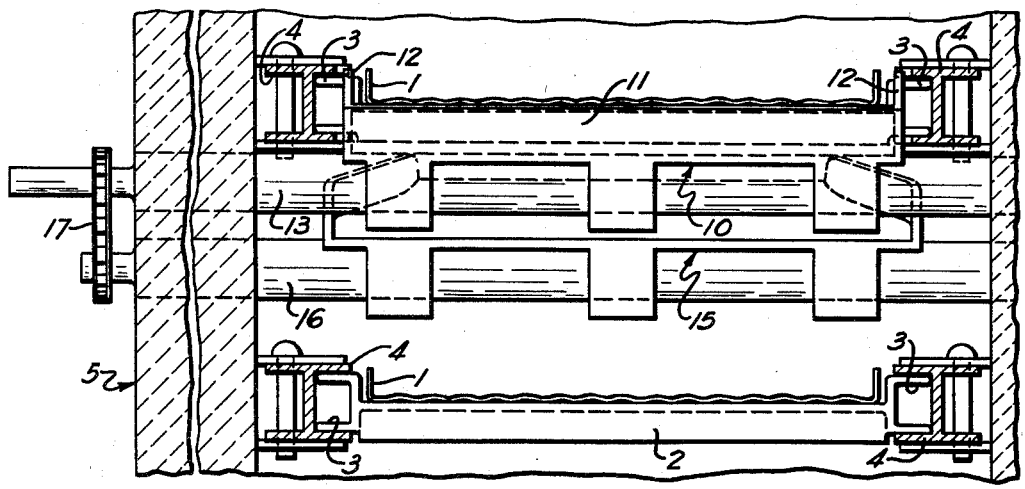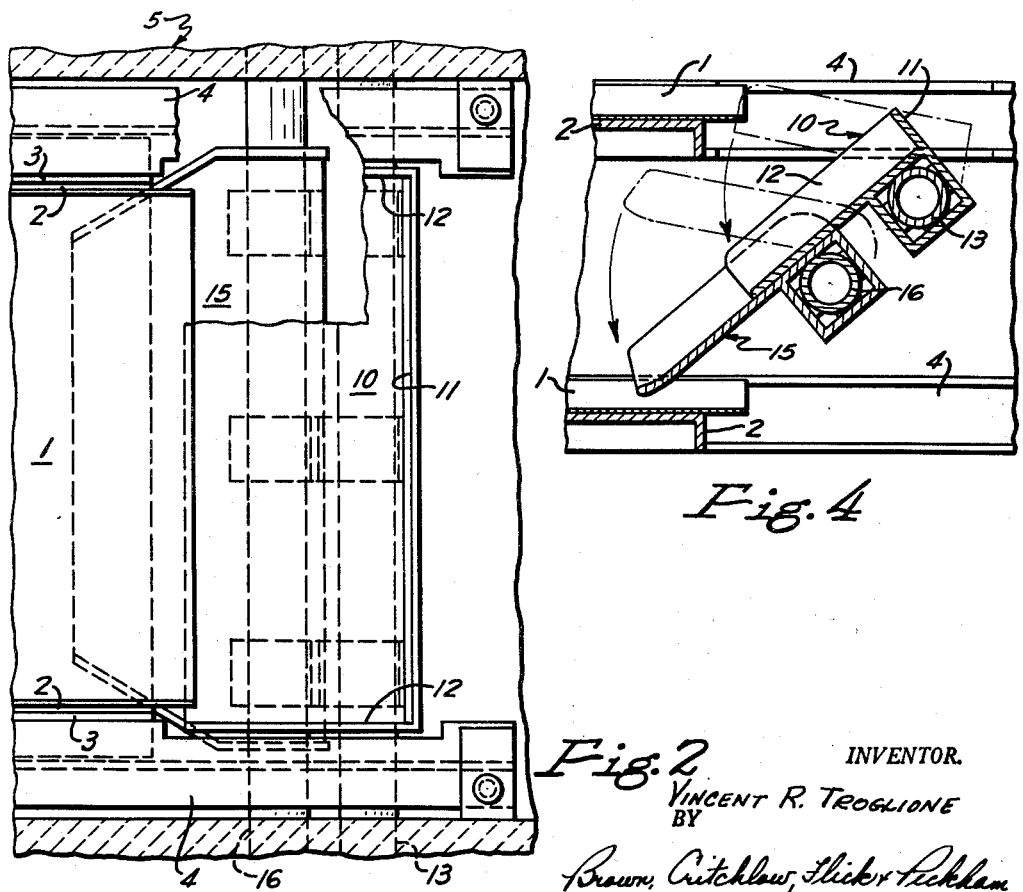

United States Patent Office 2,848,099
Patented Aug. 19, 1958

2,848,099

TRANSFER APPARATUS BETWEEN CONVEYORS

Vincent R. Troglione, Pittsburgh, Pa., assignor to Ferguson Equipment Corporation, Pittsburgh, Pa., a corporation of Pennsylvania Application October 2, 1956, Serial No. 613,527

6 Claims. (Cl. 198—45)

This invention relates to apparatus for transferring articles from one conveyor to another conveyor below it.

Where vertically spaced horizontal conveyors are disposed one above another and it is desired to carry articles along the upper conveyor and then in the opposite direction along the conveyor below it, the problem arises as to how to transfer the articles from the first to the second conveyor. Where space permits, this can be done in some cases by inclined chutes, but in heat treating furnaces such chutes are not practical because they take up too much room and they allow the articles to drop so far at the ends of the chutes that, in their heated state, the articles may be deformed or otherwise damaged. Also, permanent chutes interfere with observation of the articles on the conveyors.

It is among the objects of this invention to provide conveyor transfer apparatus which takes up but little space, which does not allow the heated articles to fall free any appreciable distance, which will not be deformed by the heat of a furnace materially, which can be moved into a position where they will not obstruct a view of the conveyors from either end, and which permits maintenance on the conveyors by repair or replacement without removal of the transfer mechanism.

In accordance with this invention, a pair of vertically spaced trays are mounted adjacent the discharge end of an upper conveyor for transferring articles therefrom to the underlying end of a conveyor below the upper one. The upper tray normally extends rearwardly from beneath the end of the upper conveyor to receive articles therefrom. Means is provided for tilting the front end of the upper tray downward to cause the articles to slide therefrom onto the lower tray. The front end of the lower tray also can be tilted down from an upper position to a position adjacent the upper surface of the lower conveyor to deliver the articles from the upper tray to the lower conveyor.

The preferred embodiment of the invention is illustrated in the accompanying drawings in which—

Fig. 2 is an enlarged fragmentary horizontal section taken on the line II—II of Fig. 1;

Fig. 3 is an enlarged fragmentary vertical section taken on the line III—III of Fig. 1; and Fig. 4 is an enlarged fragmentary vertical section showing two of the transfer trays in their lower or transfer position.

Figure 1:
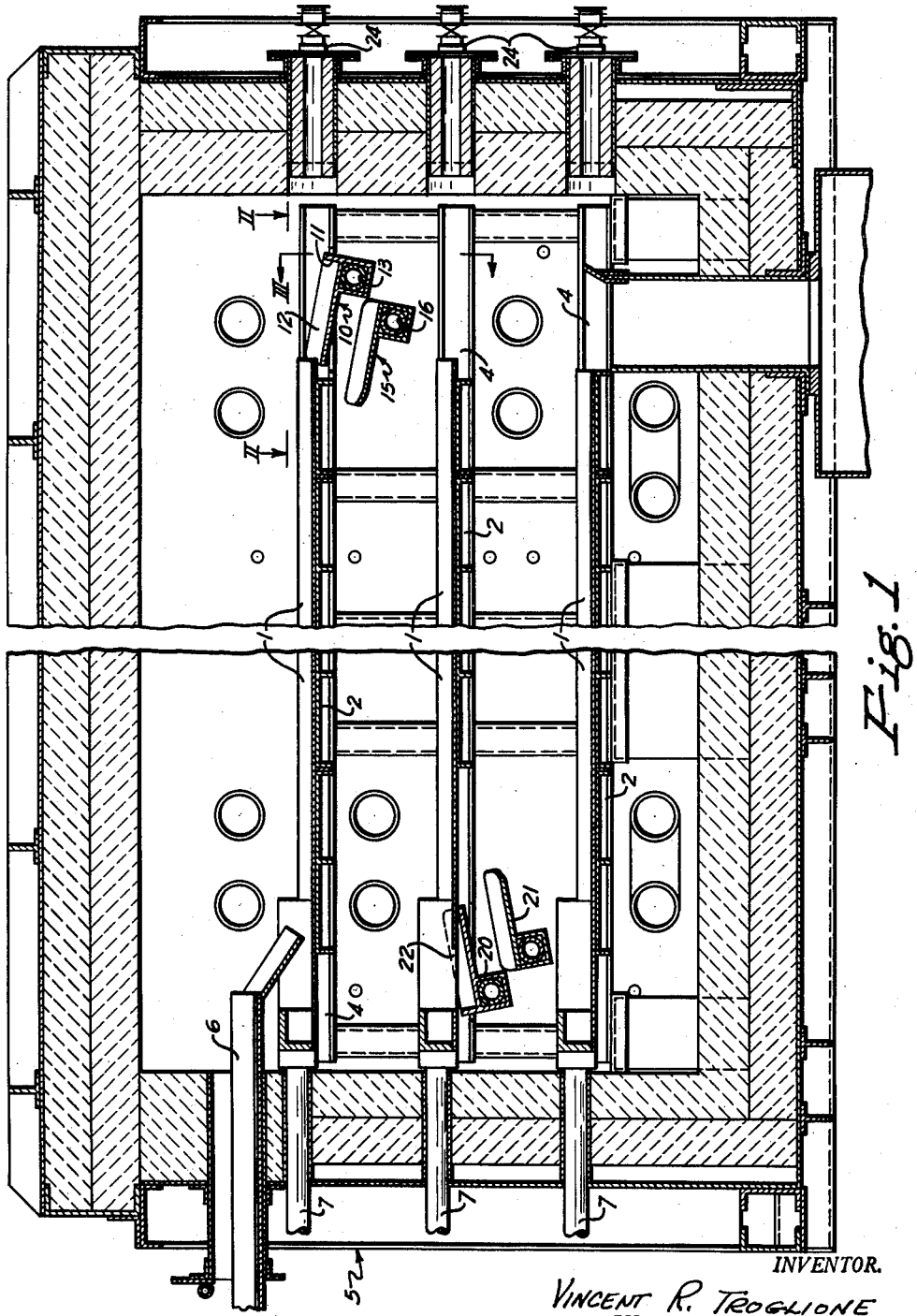
Fig. 1 is a fragmentary vertical longitudinal section through a furnace containing my transfer apparatus.

Referring to Fig. 1 of the drawings, a plurality of vertically spaced conveyors are arranged in parallel relation. Three are shown, but the invention is applicable when two or more are used. The conveyors may be any suitable type, the ones illustrated being the longitudinally reciprocable or shuffle type, in which a long pan 1 is moved lengthwise in one direction faster than in the other so that the articles on it will be advanced by inertia. Each pan may be slidably mounted on castings 2 having side flanges 3 (Fig. 3) supported by parallel I-beams 4. When the conveyors are located inside of a heat treating furnace 5, where this invention has its greatest utility, the beams may be supported from the side walls of the furnace.

The articles to be heat treated, such as bearing races for example, are fed through a chute 6 in the front wall of the furnace and onto the front end of the upper conveyor. Suitable reciprocating means (not shown) in front of the furnace act through horizontal shafts 7, slidably mounted in the front wall, to move the conveyors back and forth to cause the articles to travel to the back part of the furnace. The rear ends of the upper two conveyors are spaced from the back wall of the furnace to provide space for mechanism for transferring articles from the rear or discharge end of the top conveyor to the underlying or entry end of the middle conveyor.

It is a feature of this invention that the transfer mechanism includes a pair of pivoted trays disposed one above the other. The upper tray 10 has a back wall 11 and side walls 12, but its front end is open and extends a very short distance beneath the adjacent rear end of the upper conveyor pan when that pan is in its forward position as shown in Fig. 1. The front ends of the tray side walls extend up the sides of the conveyor pan. The tray is mounted for vertical swinging of its front end, such as by having its rear end secured to a cross shaft 13 journaled in the sides of the furnace and projecting from one side. The lower tray 15 is mounted on another cross shaft 16 journaled in the furnace in the same way, but preferably a little ahead of as well as below the other shaft. The lower tray is slightly wider than the upper one and it has no back wall so that the front end of the upper tray can nest in it. The front end of the lower tray is tapered enough to permit it to be inserted between the side walls of the middle conveyor pan. When the two trays are in their raised positions, the upper one preferably is slightly inclined downward toward the back of the furnace so that articles discharged from the top conveyor onto it will tend to move toward the back of the tray. In order to cause the trays to transfer articles from one conveyor to the other, the trays are tilted down to lower their front ends. This is done by turning one of the tray shafts by any suitable means, and simultaneously turning the other shaft through gears or sprockets and a chain 17 (Fig. 3), or the levers.

In operation, the conveyors are reciprocated in unison to move the articles being heat-treated along them. Every time the upper conveyor is moved back and then forward, articles are discharged from it onto the upper tray 10. This may be done only once or several times before the trays are actuated, but then the conveyors are stopped in their forward positions while the front ends of the trays are lowered to incline the trays as shown in Fig. 4. The front end of the upper tray then fits down into the open rear end of the lower tray, and the front end of the lower tray nearly engages the upper surface of the middle conveyor. The articles that had been discharged onto the upper tray now slide down across both trays and onto the middle conveyor without being damaged by falling free. When the trays are swung up to their normal raised positions again, the conveyors resume operation to deposit a new group of articles on the upper tray and to move the articles that are on the middle tray toward the front of the furnace.

At the front of the furnace there is another pair of transfer trays 20 and 21 constructed and operated like those just described, but used for transferring articles from the middle conveyor to the bottom one. To permit articles to be discharged from the front end of the middle conveyor, its bottom is cut away at 22 above the trays.

Two tilting trays, instead of only one, are used in each transfer zone because a single tray would have to be so long that the intense heat of the furnace would be likely to warp and deform the tray. The lower tray in each set is made tiltable, instead of being mounted permanently in inclined position, so that it can be raised after each transfer operation. This is done for two reasons, one being to prevent the conveyor pan from binding against the tray in case the pan warps. The other reason is to get the tray out of the way so that the operator of the furnace can observe the articles on the tray through observation ports 24 at the back of the furnace.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The combination with a pair of vertically spaced furnace conveyors that reciprocate lengthwise for moving articles at one level in one direction and at another level in the opposite direction, of apparatus for transferring said articles from the discharge end of the upper conveyor to the underlying end of the lower conveyor, said apparatus comprising a pair of vertically spaced trays adjacent said ends of the conveyors, the upper tray normally extending rearwardly from beneath the discharge end of the upper conveyor for receiving articles therefrom, and means for tilting the front ends of the trays downward to slide said articles from the upper tray onto the lower tray and to position the front end of the lower tray adjacent the upper surface of the lower conveyor, whereby to deliver said articles from the upper tray to the lower conveyor.

2. In the combination recited in claim 1, said conveyors having side walls, the front end of the upper tray having side walls straddling the adjoining end of the upper conveyor when the tray is in its upper position and the front end of the lowered lower tray being disposed between the side walls of the lower conveyor.

3. In the combination recited in claim 1, said trays being substantially the same length, and the lower tray extending forward in front of the upper tray when both trays are in their upper positions.

4. In the combination recited in claim 1, the trays being pivoted at their rear ends on horizontal axes transverse to the conveyors.

5. In the combination recited in claim 1, said trays being tiltable in unison from their upper to their lower positions.

6. The combination with a pair of vertically spaced furnace conveyors that reciprocate lengthwise for moving articles at one level in one direction and at another level in the opposite direction, of apparatus for transferring said articles from the discharge end of the upper conveyor to the underlying end of the lower conveyor, said apparatus comprising a pair of vertically spaced trays adjacent said ends of the conveyors, the upper tray normally extending rearwardly and downwardly from beneath the discharge end of the upper conveyor for receiving articles therefrom, the upper tray having a rear wall and side walls straddling the upper conveyor, the lower tray having side walls spaced apart far enough at their rear ends to receive the front end of the upper tray, means pivotally mounting the rear ends of the trays on horizontal axes transverse to the conveyors, the pivotal axis of the lower conveyor being offset forward relative to the pivotal axis of the upper conveyor, and means for swinging the front ends of the trays downward to incline them with the front end of the lower tray close to the upper surface of the lower conveyor and with the front end of the upper tray disposed in the rear end of the lower tray, whereby to form an inclined chute.

UNITED STATES PATENTS

References Cited in the file of this patent

| | | |
|---|---|---|
| 239,164 | Hinds | Mar. 22, 1881 |
| 299,585 | Rosensteel | June 3, 1884 |
| 562,534 | Hollingsworth | June 23, 1896 |